April 25, 1944.    F. G. PARNELL    2,347,366
INTERNAL SHOE DRUM BRAKE
Filed Dec. 11, 1941
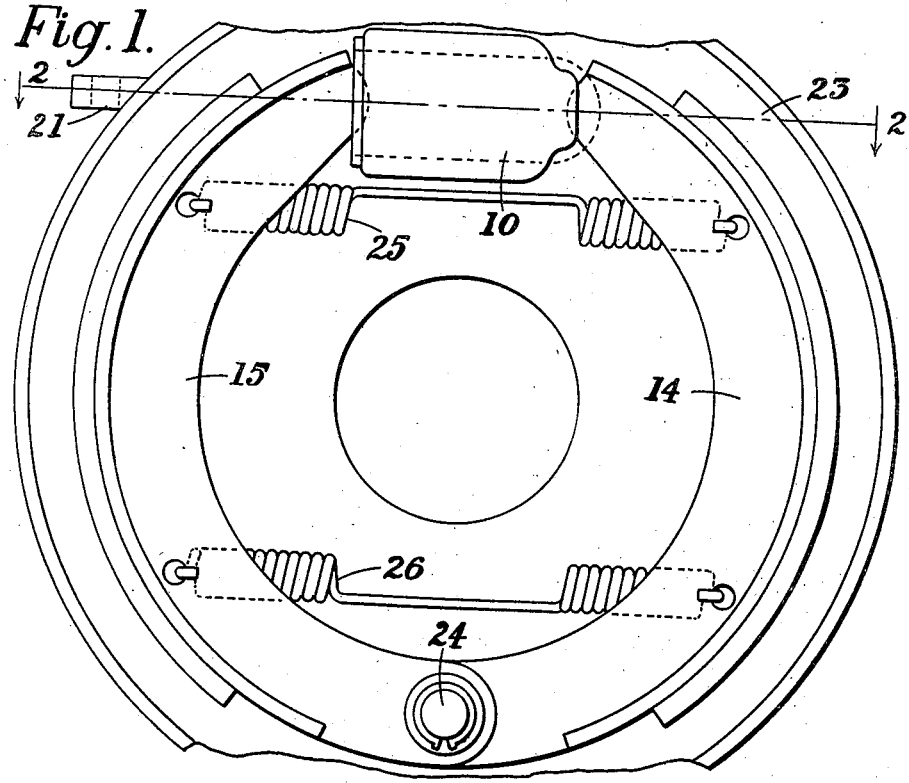
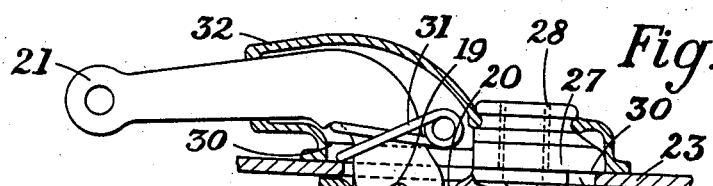
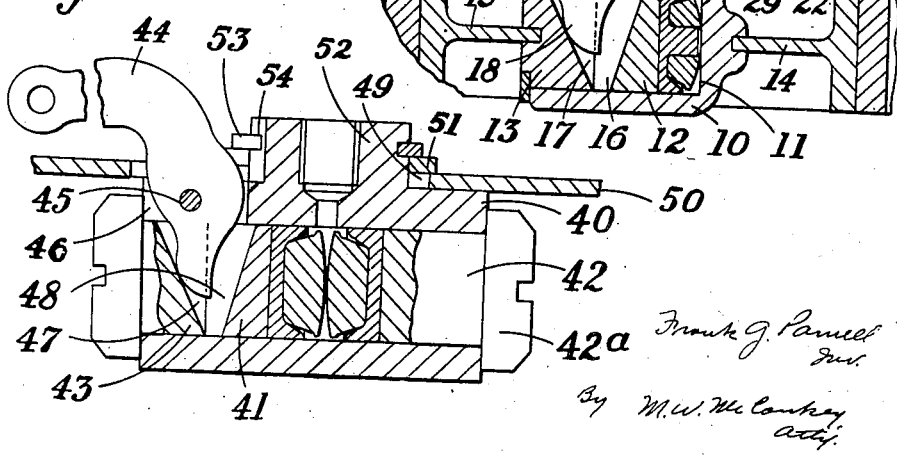

Patented Apr. 25, 1944

2,347,366

UNITED STATES PATENT OFFICE 2,347,366

INTERNAL SHOE DRUM BRAKE

Frank Gordon Parnell, Leamington Spa, England, assignor to Automotive Products Company Limited, Leamington Spa, England Application December 11, 1941, Serial No. 422,573
In Great Britain January 3, 1941

8 Claims. (Cl. 188—106)

This invention relates to internal shoe drum brakes and has for its object to provide an improved spreading device for spreading the shoes into engagement with the drum.

In internal shoe drum brakes the spreading of the shoes into engagement with the drum is commonly effected by fluid pressure acting in a wheel cylinder arranged between the ends of the brake shoes with its axis in line with the direction of movement of such ends. With such an arrangement it is customary also to provide independent means for spreading the shoes of at least some of the brakes of a vehicle, such means being usually separate from the wheel cylinder and being actuated through a mechanical linkage.

According to the present invention, in a wheel cylinder for brake operation, a plunger other than the fluid pressure operated piston or pistons is slidably mounted in the wheel cylinder and serves to transmit thrust to one of the brake shoes, the plunger being movable in the cylinder by means of a lever, cam, wedge or equivalent device to spread the shoes apart independently of the fluid pressure operation.

The reaction of the thrust exerted on the plunger by the lever, cam, wedge or equivalent is preferably transmitted to the cylinder and the cylinder is then mounted in such a manner that it is capable of sliding in a direction parallel to its longitudinal axis. The cylinder may be closed at one end and may have a single piston moved towards the open end of the cylinder by fluid introduced between the piston and the closed end of the cylinder. The plunger may abut against the outer end of the piston, said piston and plunger being provided on their abutting faces with diametral slots aligned with each other to accommodate a lever fulcrumed in a slot in the wall of the wheel cylinder and engaging the base of the slot in the plunger.

The lever may be fulcrumed on the side of the wheel cylinder adjacent the brake back-plate and may have an arm projecting outwardly through the backplate and connected to a brake operating linkage, or it may be fulcrumed on the side of the wheel cylinder remote from the brake back-plate and may have a single arm extending across the cylinder and through the back-plate, the free end of the lever being connected to a brake operating linkage.

The invention is hereinafter described with reference to the accompanying drawing, in which—

Figure 1 is an elevation of a brake assembly incorporating the invention;

Figure 2 is a section on the line 2—2 of Figure 1; and

Figure 3 is a section corresponding to Figure 2 showing a modified form of the invention.

In the form of the invention shown in Figures 1 and 2, the wheel cylinder 10 is of the single ended type, that is, it is closed at one end 11 and has a single piston 12 moved towards the open end of the cylinder by fluid introduced between the piston 12 and the closed end 11 of the cylinder. Abutting the outer end of the piston 12 is a plunger 13 slidable in the cylinder 10, the ends of the two brake shoes 14 and 15 to be operated being engaged respectively by the closed end 11 of the cylinder and the plunger 13. The piston and plunger are provided on their meeting faces with diametral slots 16 and 17 aligned with each other to accommodate one arm 18 of a lever fulcrumed at 19 in a slot 20 in the wall of the wheel cylinder 10 and having a second arm 21 projecting outwardly and bent through substantially 90° to lie parallel to the general plane of the brake. The arm 18 of the lever entering the cylinder engages with the base of the slot 17 in the plunger 13. The wheel cylinder 10 is mounted to slide in a slot 22 in the back-plate 23 of the brake to which it is attached, so that the cylinder can move in one direction and the piston in the other to apply both shoes 14 and 15 to the drum. The admission of fluid under pressure to the cylinder 10 moves the piston 12 outwardly, carrying the plunger 13 with it, so that the shoes 14 and 15 are spread apart. A pull applied to the outer end of the lever in a direction substantially perpendicular to the general plane of the brake causes it to turn about its fulcrum 19 in the cylinder and force the plunger 13 outwardly, thus spreading the shoes 14 and 15 apart. The piston 12 is left behind in the cylinder when the plunger 13 is moved by the lever, and the fluid pressure system is thus unaffected by the mechanical operation. Similarly, when the shoes 14 and 15 are actuated by fluid pressure, the lever is received in the slot 16 in the piston and is not turned about its fulcrum. The two brake shoes 14 and 15 are mounted in the well-known manner on an anchor pin 24 supported by the back-plate 23 and an adjusting device of any known type may be used to adjust the initial position of the shoes with relation to the drum and so to compensate for wear of the brake linings. The usual shoe pull-off springs 25 and 26 are provided.

The cylinder 10 has a portion 27 projecting through the back-plate 23 and including a boss 28 to receive a flexible connecting pipe leading from the master cylinder by which the brakes are operated. The cylinder has shoulders 29 which engage the inner surface of the back-plate and the projecting portion 27 is provided with projecting end portions 30 which engage the outer surface of the back-plate, so that the cylinder is retained in the slot 22 but is free to slide therein. The cylinder 10 is fitted in position by passing one end projection through the slot, sliding the body to the extreme end of the slot at the end through which the projection has been passed, passing the other end projection through and then centralising the body in the slot. A spring 31 acting on the arm 21 of the lever tends to keep the arm 18 of the lever constantly in engagement with the base of the slot 17 and thus prevents looseness and rattling of the lever. A flexible boot 32 encloses the lever pivot and the spring 31 and thus prevents the entry of dust, water and other foreign matter into the wheel cylinder.

In an alternative arrangement (not shown) the cylinder is slotted at two diametrically opposite points and the lever, which is pivoted in the slot on one side of the cylinder, extends right across the cylinder and through the opposite slot, its projecting end being connected to a convenient operating linkage. The lever is formed with a rounded bulge which engages the base of the slot in the plunger, as in the example previously described.

The invention may also be applied to a double ended fluid pressure wheel cylinder, that is, a cylinder which is open at both ends and has opposed pistons bearing on the respective brake shoes. Figure 3 shows an arrangement of this nature, the wheel cylinder 40 being open at both ends and having slidably mounted within it two opposed pistons 41 and 42. The piston 42 has at its outer end an enlarged head 42ᵃ, the under surface of which, by engaging with the end of the wheel cylinder 40, limits the movement of the piston 42 into the latter. The piston 41 is shorter than the piston 42 and in the end of the cylinder beyond the piston 41 is mounted a plunger 43, which abuts against the end of the piston 41. A lever 44 similar to the lever 18—21 shown in Figure 2 is pivoted at 45 in a slot 46 in the wheel cylinder body, one of its arms engaging with the base of a diametral slot 47 in the plunger 43, whilst a corresponding diametral slot 48 in the piston 41 permits free movement of the piston relative to the lever. The cylinder is mounted to slide in a slot 49 in the back-plate 50, being retained in position by a plate 51 surrounding a spigot 52 projecting from the cylinder and retained on said spigot by a spring ring 53 lying in a groove 54 around the spigot.

When the brakes are applied by the fluid pressure, the two pistons are forced apart to spread the shoes into contact with the drum, the cylinder remaining stationary. When the lever 44 is operated, the plunger 43 is urged outwardly and the cylinder itself is urged in the opposite direction, the thrust on the cylinder being transmitted through the head 42ᵃ on the piston 42 to the shoe which engages that piston.

Other modifications may be made in the arrangement of the spreading device according to the invention. For example, the lever may be replaced by a wedge device adapted to be moved through a pair of diametrally opposed slots in the cylinder walls and engaging the base of a slot in the plunger to move the latter outwardly with relation to the cylinder.

What I claim is:

1. A wheel cylinder for brake operation having at least one fluid pressure operating piston reciprocable therein and having a plunger which is slidably mounted in the cylinder and serves to transmit thrust to one of the brake shoes, the plunger being movable in the cylinder by means of a mechanical pressure device to spread the shoes apart independently of the fluid pressure operation, said plunger abutting against the outer end of the piston, a longitudinal slot in said cylinder, said piston and plunger being provided on their abutting faces with diametral slots aligned with each other to accommodate a lever fulcrumed in the slot in the wheel cylinder and engaging the base of the slot in the plunger.

2. A wheel cylinder according to claim 1 wherein the lever is fulcrumed on the side of the wheel cylinder adjacent the brake back-plate and has an arm projecting outwardly through the backplate and connected to a brake operating linkage.

3. A wheel cylinder for brake operation having at least one piston reciprocable therein and having a plunger which is slidably mounted in the cylinder and serves to transmit thrust to one of the brake shoes, the plunger being movable in the cylinder by means of a mechanical pressure device to spread the shoes apart independently of the fluid pressure operation, and the reaction of the thrust exerted on the plunger by the mechanical pressure device being transmitted to the cylinder.

4. A wheel cylinder according to claim 3, characterized by the feature that the cylinder is mounted in such a manner that it is capable of sliding in a direction parallel to its longitudinal axis.

5. A wheel cylinder according to claim 3, characterized by the feature that the cylinder is mounted in such a manner that it is capable of sliding in a direction parallel to its longitudinal axis, said cylinder being closed at one end and having a single piston moved toward the open end of the cylinder by fluid introduced between the piston and the closed end of the cylinder.

6. A wheel cylinder for brake operation having a piston reciprocable therein and a plunger interposed between the said piston and a brake shoe operated by the said piston, the plunger being movable in the cylinder by fluid pressure acting on the piston, and a mechanical pressure device acting on the plunger to spread the shoes apart independently of the fluid pressure operation, the reaction of the thrust exerted on the plunger by the mechanical pressure device being transmitted to the cylinder.

7. In a wheel cylinder for brake operation having one end closed and a piston movable therein by fluid acting between the said piston and the closed end, the cylinder being mounted to slide in a direction parallel to its longitudinal axis so as to exert a spreading force between the ends of a pair of brake shoes, means for spreading the brake shoes mechanically comprising a plunger interposed between the piston and the open end of the cylinder, and a mechanical pressure device for moving said plunger in the cylinder, the reaction of the thrust exerted on the plunger by the mechanical pressure device being transmitted to the cylinder.

8. In a wheel cylinder for brake operation having a fluid pressure operating piston reciprocable therein, means for spreading mechanically a pair of brake shoes between which the wheel cylinder is mounted, said means comprising a plunger interposed between the piston and one of the brake shoes, a slot in the wall of the cylinder, aligned diametral slots in the adjacent faces of the piston and plunger, and a lever fulcrumed in the slot in the cylinder wall and engaging the base of the slot in the plunger.

FRANK GORDON PARNELL.